(12) United States Patent
Parikh et al.

(10) Patent No.: US 12,071,873 B2
(45) Date of Patent: Aug. 27, 2024

(54) ANTI-ROTATION FEATURES FOR CRANKCASE VENTILATION FILTERS

(71) Applicant: CUMMINS FILTRATION IP, INC., Columbus, IN (US)

(72) Inventors: Chirag D. Parikh, Madison, WI (US); Rajath Martin, Madison, WI (US); Ken Tofsland, Stoughton, WI (US); Ganesh Ram Ramanujam Karthikeyan, West Lafayette, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 683 days.

(21) Appl. No.: 17/055,064

(22) PCT Filed: May 21, 2019

(86) PCT No.: PCT/US2019/033238
§ 371 (c)(1),
(2) Date: Nov. 12, 2020

(87) PCT Pub. No.: WO2019/226608
PCT Pub. Date: Nov. 28, 2019

(65) Prior Publication Data
US 2021/0189926 A1    Jun. 24, 2021

Related U.S. Application Data

(60) Provisional application No. 62/675,978, filed on May 24, 2018.

(51) Int. Cl.
*F01M 13/04* (2006.01)
*B01D 46/00* (2022.01)
(Continued)

(52) U.S. Cl.
CPC ......... *F01M 13/04* (2013.01); *B01D 46/0045* (2013.01); *B01D 46/2414* (2013.01);
(Continued)

(58) Field of Classification Search
None
See application file for complete search history.

(56) References Cited

U.S. PATENT DOCUMENTS 2,181,608 A    11/1939   Russell
2,620,071 A *  12/1952   Zenick ............... B01D 29/216
                                                         210/450

(Continued)

FOREIGN PATENT DOCUMENTS

DE    33 32 324 A1    3/1984
DE    20100363 U1    12/2001
(Continued)

OTHER PUBLICATIONS

Extended European Search Report for European Patent App. No. 16849412.8, dated Apr. 2, 2019, 7 pages.
(Continued)

*Primary Examiner* — Brit E. Anbacht
(74) *Attorney, Agent, or Firm* — Foley & Lardner LLP

(57) ABSTRACT

A rotating crankcase ventilation filter element comprises a filter media comprising a plurality of filter media layers. A first end cap is positioned on a filter media first end. The first end cap comprises a first end cap main body, and a first plurality of indenting features positioned on the first end cap main body proximate the filter media first end. The first plurality of indenting features contact and indent corresponding segments of the filter media first end, causing the plurality of filter media layers to interlock at the corresponding segments. The interlocking prevents movement of the plurality of filter media layers relative to each other.

9 Claims, 9 Drawing Sheets

(51) Int. Cl.
  *B01D 46/24* (2006.01)
  *B01D 46/26* (2006.01)
  *B01D 46/52* (2006.01)
(52) U.S. Cl.
  CPC .......... *B01D 46/26* (2013.01); *B01D 46/528* (2013.01); *B01D 2265/021* (2013.01); *B01D 2275/105* (2013.01); *F01M 2013/0438* (2013.01)

(56) References Cited

U.S. PATENT DOCUMENTS

| | | | |
|---|---|---|---|
| 2,701,062 A | 2/1955 | John | |
| 2,770,426 A | 11/1956 | Sievers | |
| 3,127,255 A | 3/1964 | Winslow | |
| 3,467,256 A | 9/1969 | Humbert, Jr. | |
| 3,469,706 A | 9/1969 | Corning | |
| 3,708,957 A | 1/1973 | Labadie | |
| 3,985,657 A | 10/1976 | Coughlan | |
| 4,009,715 A | 3/1977 | Forberg et al. | |
| 5,173,186 A | 12/1992 | Spafford et al. | |
| 5,290,445 A | 3/1994 | Buttery | |
| 5,643,467 A | 7/1997 | Romanco | |
| 5,660,729 A | 8/1997 | Baumann | |
| 5,736,040 A | 4/1998 | Duerrstein et al. | |
| 5,792,351 A | 8/1998 | Wehrle et al. | |
| 5,853,577 A | 12/1998 | Gizowski et al. | |
| 6,071,300 A | 1/2000 | Brenneman et al. | |
| 6,051,144 A | 4/2000 | Clack et al. | |
| 6,086,763 A | 7/2000 | Baumann | |
| 6,095,964 A | 8/2000 | Purvey | |
| 6,146,527 A | 11/2000 | Oelschlaegel | |
| 6,152,120 A | 11/2000 | Julazadeh | |
| 6,224,531 B1 | 5/2001 | Frehland et al. | |
| 6,299,772 B1 | 10/2001 | Huschke et al. | |
| 6,424,067 B1 | 7/2002 | Samways | |
| 6,530,872 B2 | 3/2003 | Frehland et al. | |
| 6,536,600 B1 * | 3/2003 | Nieuwland | F01M 11/03 210/453 |
| 6,607,665 B2 | 8/2003 | Fick et al. | |
| 6,620,090 B2 | 9/2003 | Fischer et al. | |
| 6,973,925 B2 | 12/2005 | Sauter et al. | |
| 6,974,408 B2 | 12/2005 | Grosse-Wiesmann | |
| 7,077,881 B2 | 7/2006 | Franzen et al. | |
| 7,081,146 B2 | 7/2006 | Hallgren et al. | |
| 7,090,634 B2 | 8/2006 | Mackel et al. | |
| 7,122,123 B2 | 10/2006 | Carew | |
| 7,235,177 B2 | 6/2007 | Herman et al. | |
| 7,250,066 B2 | 7/2007 | Seipler | |
| 7,297,098 B2 | 11/2007 | Fell | |
| 7,300,396 B2 | 11/2007 | Pitkamaki et al. | |
| 7,338,546 B2 | 3/2008 | Eliasson et al. | |
| 7,396,373 B2 | 7/2008 | Lagerstedt et al. | |
| 7,428,898 B2 | 9/2008 | Roberts et al. | |
| 7,445,653 B2 | 11/2008 | Trautmann et al. | |
| 7,662,220 B2 | 2/2010 | Fukano et al. | |
| 7,713,185 B2 | 5/2010 | Baumann et al. | |
| 7,799,109 B2 | 9/2010 | Dunsch et al. | |
| 7,811,347 B2 | 10/2010 | Carlsson et al. | |
| 7,824,458 B2 | 11/2010 | Borgstrom et al. | |
| 7,824,459 B2 | 11/2010 | Borgstrom et al. | |
| 7,959,547 B2 | 6/2011 | Baumann et al. | |
| 8,002,690 B2 | 8/2011 | Wiesmann et al. | |
| 8,172,917 B2 | 5/2012 | Kup et al. | |
| 8,177,874 B2 | 5/2012 | Bittle et al. | |
| 8,182,408 B2 | 5/2012 | Isaksson et al. | |
| 8,376,924 B2 | 2/2013 | Burford et al. | |
| 8,404,029 B2 | 3/2013 | Lundgren et al. | |
| 8,540,613 B2 | 9/2013 | Burford et al. | |
| 8,632,676 B2 | 1/2014 | Formica | |
| 8,794,222 B2 | 8/2014 | Schwandt et al. | |
| 9,186,686 B2 | 11/2015 | Mackel et al. | |
| 9,194,265 B2 | 11/2015 | Parikh et al. | |
| 9,233,325 B2 | 1/2016 | Carlsson et al. | |
| 9,346,002 B2 * | 5/2016 | Kleynen | B01D 46/2414 |
| 9,422,738 B2 | 8/2016 | Hegi | |
| 9,427,747 B2 | 8/2016 | Karlsson | |
| 9,474,993 B2 | 10/2016 | Fell et al. | |
| 9,714,591 B2 | 7/2017 | Szepessy | |
| 10,195,551 B2 | 2/2019 | Piva et al. | |
| 10,918,986 B2 * | 2/2021 | Tanaka | B01D 29/21 |
| 2002/0088445 A1 | 7/2002 | Weindorf et al. | |
| 2004/0154977 A1 | 8/2004 | Wells et al. | |
| 2005/0120685 A1 | 6/2005 | Fischer et al. | |
| 2006/0090651 A1 | 5/2006 | Liu et al. | |
| 2006/0091061 A1 * | 5/2006 | Brown | B01D 46/527 210/440 |
| 2007/0114170 A1 | 5/2007 | Krull et al. | |
| 2007/0215561 A1 | 9/2007 | Yates et al. | |
| 2009/0145095 A1 | 6/2009 | Juliar et al. | |
| 2009/0294351 A1 | 12/2009 | Herman et al. | |
| 2010/0126126 A1 | 5/2010 | Cheng | |
| 2010/0146917 A1 | 6/2010 | Coulonvaux et al. | |
| 2011/0180051 A1 | 7/2011 | Schwandt et al. | |
| 2011/0247309 A1 | 10/2011 | Smith et al. | |
| 2011/0252974 A1 | 10/2011 | Verdegan et al. | |
| 2011/0281712 A1 | 11/2011 | Schlamann et al. | |
| 2012/0055126 A1 | 3/2012 | Whittier et al. | |
| 2012/0108337 A1 | 5/2012 | Kelly et al. | |
| 2013/0032521 A1 | 2/2013 | Baker | |
| 2013/0248464 A1 | 9/2013 | Schweitzer | |
| 2014/0157738 A1 | 6/2014 | Eberle | |
| 2015/0336041 A1 | 11/2015 | Hatfield et al. | |
| 2017/0001133 A1 | 1/2017 | Ishida et al. | |
| 2017/0296956 A1 | 10/2017 | Ishida et al. | |
| 2018/0104633 A1 | 4/2018 | Bonne et al. | |
| 2018/0304179 A1 | 10/2018 | Auxter et al. | |
| 2019/0046911 A1 * | 2/2019 | Deshpande | B01D 46/0031 |
| 2020/0108337 A1 | 4/2020 | Kolczyk et al. | |
| 2020/0276527 A1 | 9/2020 | Macoretta et al. | |

FOREIGN PATENT DOCUMENTS

| | | | |
|---|---|---|---|
| DE | 10300976 A1 | 7/2003 | |
| DE | 10338770 A1 | 3/2005 | |
| DE | 10 2004 030 910 A1 | 1/2006 | |
| DE | 10 2007 043 462 B3 | 2/2009 | |
| DE | 10 2008 033 638 A1 | 2/2009 | |
| DE | 10 2008 030 028 A1 | 12/2009 | |
| DE | 10 2009 019 950 A1 | 11/2010 | |
| DE | 10 2009 018 000 A1 | 12/2010 | |
| DE | 10 2009 035 895 B4 | 5/2012 | |
| DE | 10 2010 035 217 B4 | 9/2013 | |
| EP | 0 982 059 A1 | 3/2000 | |
| EP | 1 645 320 A1 | 4/2006 | |
| EP | 1 987 872 A1 | 11/2008 | |
| EP | 2 335 798 A1 | 6/2011 | |
| EP | 2 654 921 A2 | 10/2013 | |
| GB | 0 800 796 | 9/1958 | |
| GB | 1 003 164 A | 9/1965 | |
| GB | 2 457 598 A | 8/2009 | |
| WO | WO-84/04050 A1 | 10/1984 | |
| WO | WO-8404050 A1 * | 10/1984 | |
| WO | WO-2005/083240 | 9/2005 | |
| WO | WO2012/088317 A2 | 6/2012 | |
| WO | WO-2016/170248 A2 | 10/2016 | |
| WO | WO-2017/053267 | 3/2017 | |
| WO | WO-2017053267 A1 * | 3/2017 | B01D 46/0001 |
| WO | WO-2018/002244 A1 | 1/2018 | |
| WO | WO-2022150130 A1 * | 7/2022 | |

OTHER PUBLICATIONS

International Search Report & Written Opinion for PCT/US2016/052600 dated Dec. 16, 2016, 9 pages.
International Search Report and Written Opinion issued for PCT Application No. PCT/US2019/033238 issued Aug. 6, 2019, 8 pages.
Non-Final Office Action issued for U.S. Appl. No. 15/761,704 issued Jul. 11, 2022, 19 pages.
Non-Final Office Action issued for U.S. Appl. No. 15/761,704, issued Jan. 28, 2021, 36 pages.
Advisory Action issued for U.S. Appl. No. 15/761,704 issued Oct. 22, 2021, 6 pages.

(56) References Cited

OTHER PUBLICATIONS

Extended European Search Report issued for European Patent Application No. EP 19808501.1 issued Jan. 18, 2022, 9 pages.

* cited by examiner

ANTI-ROTATION FEATURES FOR CRANKCASE VENTILATION FILTERS

CROSS-REFERENCE TO RELATED APPLICATIONS

The present application claims priority to U.S. Provisional Application No. 62/675,978, filed May 24, 2018 and the contents of which are incorporated herein by references in the entirety and for all purposes.

TECHNICAL FIELD

The present disclosure relates generally to filters for use with internal combustion engine systems.

BACKGROUND

During operation of an internal combustion engine, a fraction of combustion gases can flow out of the combustion cylinder and into the crankcase of the engine. These gases are often called "blowby" gases. The blowby gases include a mixture of aerosols, oils, and air. If vented directly to the ambient, the aerosols contained in the blowby gases can harm the environment. Accordingly, the blowby gases are often routed out of the crankcase via a crankcase ventilation system. The crankcase ventilation system may pass the blowby gases through a coalescer (i.e., a coalescing filter element) to remove a majority of the aerosols and oils contained in the blowby gases. The filtered blowby gases ("clean" gases) are then either vented to the ambient (in open crankcase ventilation systems) or routed back to the air intake for the internal combustion engine for further combustion (in closed crankcase ventilation systems).

Some crankcase ventilation systems utilize rotating crankcase ventilation filter elements, for example, rotating coalescer elements that increase the filter efficiency of crankcase ventilation systems by rotating the coalescer element during filtering. In rotating coalescer elements, the contaminants (e.g., oil droplets suspended and transported by blowby gases) are separated at least in part by centrifugal separation techniques. Additionally, the rotation of the coalescer element can create a pumping effect, which reduces the pressure drop through the crankcase ventilation system.

In some embodiments, the rotating crankcase ventilation filter element may include a corrugated and/or wound axial filter media layers, for example, a filter media layer wound into a roll. When used in rotating filters (e.g., as a filter media in a rotating coalescer filter element) the layers of filter media may become lose when the filter element is spinning, especially at elevated temperature which may cause a mass shift and therefore whirling. The mass shift may unbalance the filter element, which can damage bearings and reduce the life of crankcase ventilation filters.

SUMMARY

Embodiments described herein relate generally to systems and methods for securing a plurality of filter media layers of a filter media within a housing and in particular, to top and bottom end caps positioned on axial ends of the filter media, at least one of which includes indenting features configured to indent and interlock plurality of filter media layers at the indenting points.

In a set of embodiments, a rotating crankcase ventilation filter element comprises a filter media comprising a plurality of filter media layers. A first end cap is positioned on a filter media first end of the filter media. The first end cap comprises a first end cap main body, and a first plurality of indenting features positioned on the first end cap main body proximate the filter media first end. The first plurality of indenting features contact and indent corresponding segments of the filter media first end causing the plurality of filter media layers to interlock at the corresponding segments, the interlocking preventing movement of the plurality of filter media layers relative to each other.

In another set of embodiments, an end cap assembly for a filter element comprises a first end cap configured to be positioned on a filter media first end of a filter media that comprises a plurality of filter media layers. The first end cap comprises a first end cap main body, and a first plurality of indenting features positioned on the first end cap main body. The first plurality of indenting features are configured to contact and indent corresponding segments of the filter media first end so as to cause the plurality of filter media layers to interlock at the corresponding segments, the interlocking preventing movement of the plurality of filter media layers relative to each other. A second end cap is configured to be positioned on a filter media second end of the filter media opposite the filter media first end.

In another set of embodiments, a method comprises providing a wound filter media comprising a plurality of filter media layers. A filter media first end of the filter media is positioned on a first end cap. The first end cap comprises a first end cap main body, and a first plurality of indenting features are positioned on the first end cap main body. The first plurality of indenting features are configured to contact and indent corresponding segments of the filter media first end, causing the plurality of filter media layers to interlock at the corresponding segments. The interlocking prevents movement of the plurality of filter media layers relative to each other. A filter media second end of the filter media is positioned opposite the filter media first end on a second end cap.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1A:
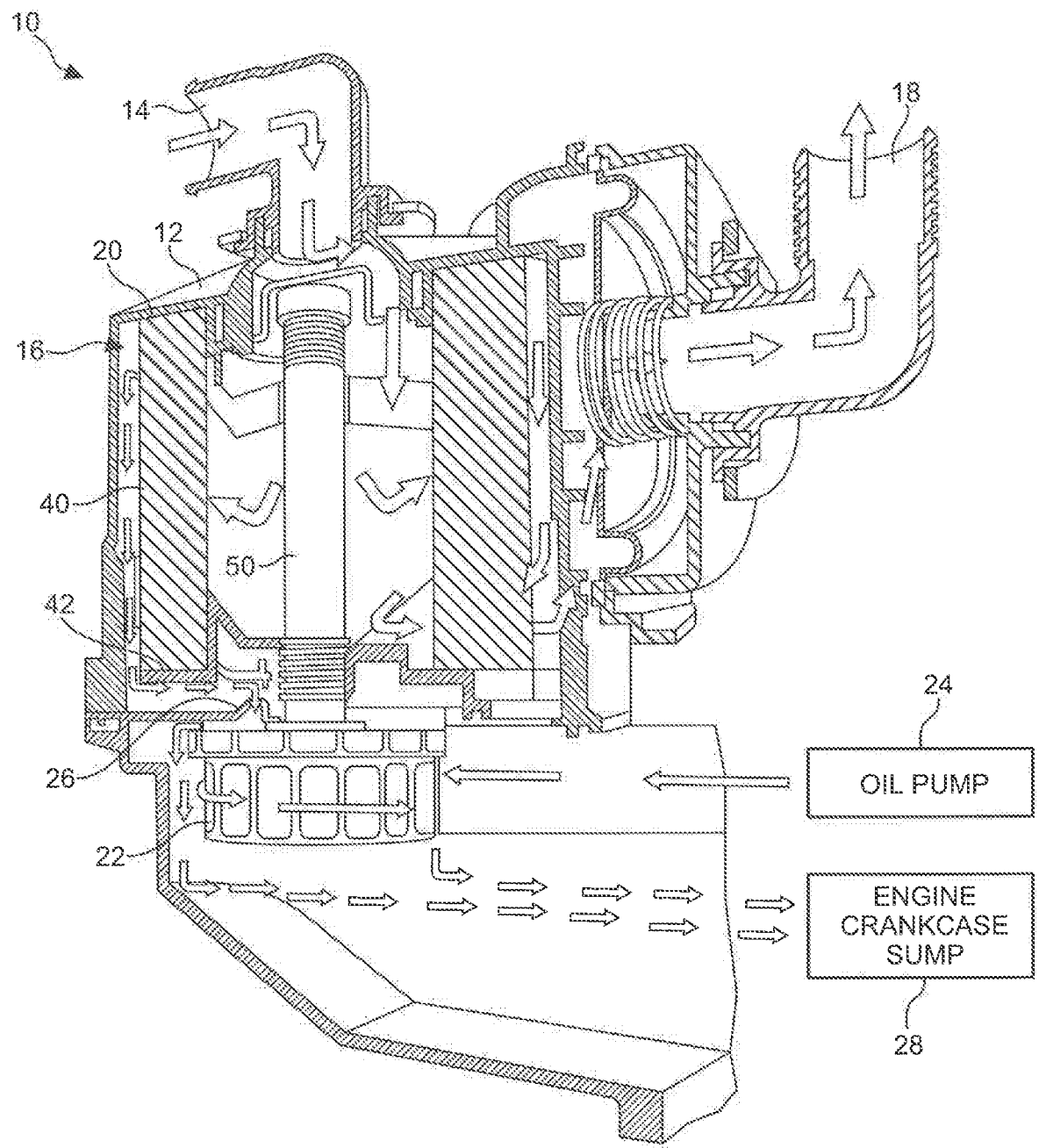
FIG. 1A is a cross-sectional view of a crankcase ventilation system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for securing a plurality of filter media layers of a filter media within a housing and in particular, to top and bottom end caps positioned on axial ends of the filter media, at least one of which includes indenting features configured to indent and interlock plurality of filter media layers at the indenting points.

Embodiments of the rotating crankcase ventilation filter elements described herein may provide benefits including, for example: (1) providing indenting features in a first and/or second end cap of the filter element which interlock a plurality of filter media layers of a filter media of the filter element so as to prevent relative movement of the plurality of filter media layers due to rotation of the filter element; (2) preventing unwinding of the plurality of filter media layers which can reduce filtering efficiency of the filter media; (3) preventing mass shift and maintaining rotational balance of the filter media, therefore preventing damage to bearings of a motor or turbine configured to rotate the filter element; and (4) reducing maintenance costs and increasing life of the filter element as well as rotating components used to rotate the filter element.

Referring to FIG. 1A, a cross-sectional view of a crankcase ventilation system 10 is shown according to an example embodiment. The crankcase ventilation system 10 is used to describe the basic operations of a system that includes a rotating crankcase ventilation filter element 16 (e.g., a rotating coalescer element) driven by a pressurized fluid or a motor. The crankcase ventilation system 10 generally processes blowby gases received from an internal combustion engine crankcase to remove aerosols, oils, and other particulate contained in the crankcase blowby gases. The crankcase ventilation system 10 generally includes a housing 12 having an inlet 14 that receives crankcase blowby gases to be filtered (e.g., from a crankcase of an internal combustion engine), a central compartment having a rotating crankcase ventilation filter element 16, for example, a rotating coalescer element installed therein, and an outlet 18 that provides filtered blowby gases to the internal combustion engine (in a closed crankcase ventilation system) or to the ambient (in an open crankcase ventilation system).

During operation of the crankcase ventilation system 10, blowby gases enter the housing 12 through the inlet 14. The blowby gases are directed to the central compartment where the blowby gases flow through the filter element 16 in an inside-out manner. In an alternate arrangement, the crankcase ventilation system 10 can be configured to have an outside-in flow arrangement. The filter element 16 may be coupled to a central shaft 50 that transfers rotation to the filter element 16. The central shaft 50 may be rotationally driven by a turbine 22 that is rotated by a jet of oil generated by an oil pump 24. The turbine 22 may be an impulse turbine. As the filter element 16 rotates, the filter element 16 (e.g., a rotating coalescer element) separates oil, aerosols, and other contaminants contained in the blowby gases. The separated contaminants drain from the housing 12 through a drain 26 and return to the engine crankcase sump 28. The filter element 16 may include a first endcap 20, a second endcap 42, and a filter media 40 (e.g., a separating device). In various embodiments, the filter media 40 may comprise a corrugated and wound filter media configured for axial flow such as the filter element 100, 200 or 300 described in further detail below. For example, the filter media 40 may include a plurality of filter media layers formed by winding or rolling a single layer of filter media into a cylindrical shape.

Figure 1B:
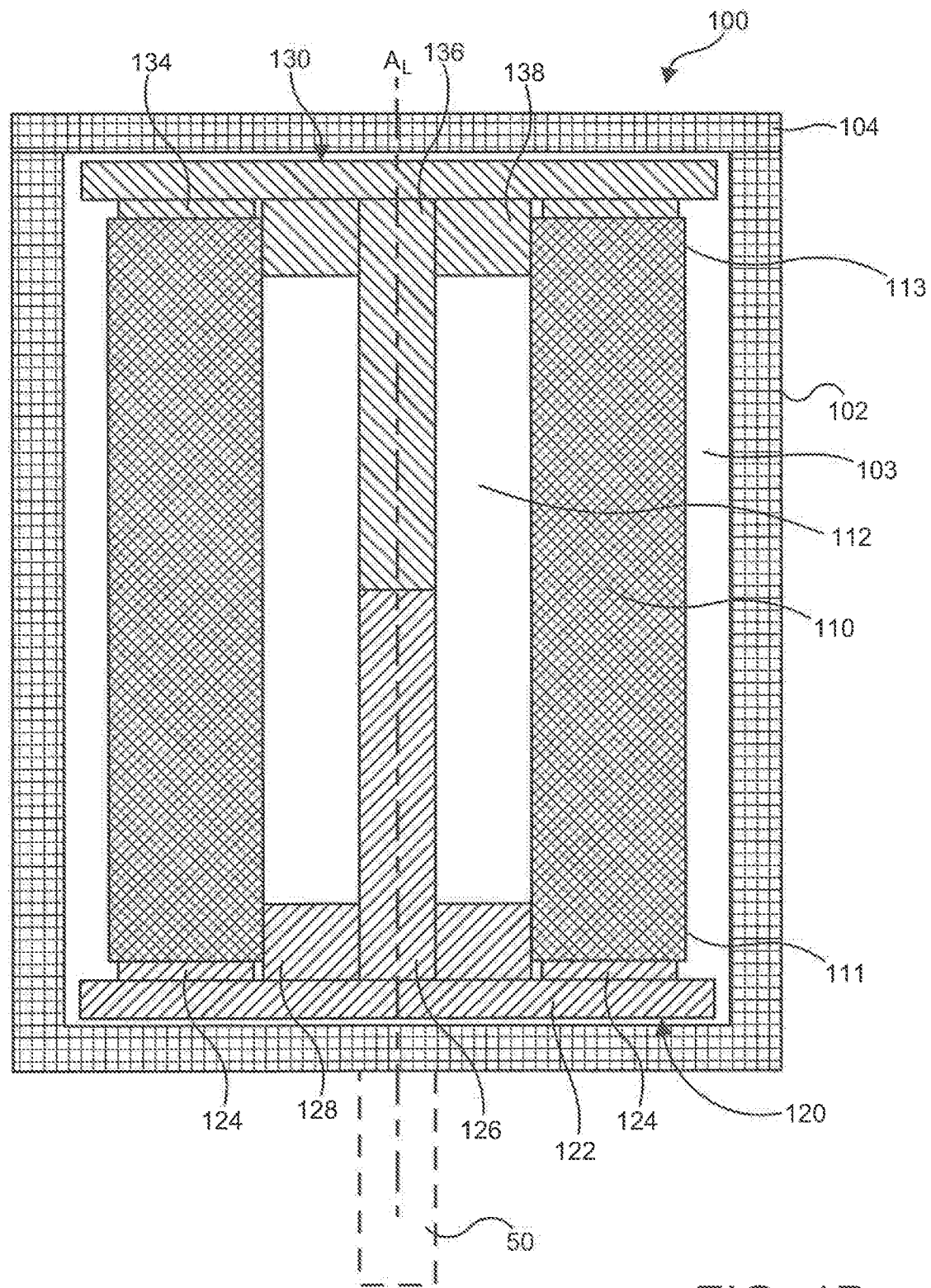
FIG. 1B is a schematic illustration of a filter element, according to an embodiment.

FIG. 1B is a schematic illustration of a filter element 100 that may be used as the filter element in the crankcase ventilation system 10, according to an embodiment. The filter element 100 may be used to filter a fluid e.g., a gas (e.g., air, fuel, air-fuel mixture, blowby gases) or any other fluids used in internal combustion engines. The filter element 100 comprises a housing 102 and a filter media 110 disposed within the housing. In particular embodiments, the filter element 100 comprises a rotating crankcase ventilation filter element. In such embodiments, the filter element 100 may be configured to filter crankcase blowby gases received from the internal combustion engine crankcase, for example, to remove aerosols, oils, and other particulate contained in the crankcase blowby gases. In various embodiments, the filter element 100 may be mounted or coupled to the central shaft 50. The central shaft 50 may be operatively coupled to a motor (e.g., a DC motor) or turbine and configured to rotate the filter element 100, for example, to facilitate centrifugal separation of aerosols, oils, water, etc. from the blowby gases.

The housing 102 defines an internal volume 103 within which the filter media 110 is disposed. The housing 102 may be formed from a strong and rigid material, for example plastics (e.g., polypropylene, high density polyethylene, polyvinyl chloride, etc.), metals (e.g., aluminum, stainless steel, etc.), polymers (e.g., reinforced rubber, silicone) or any other suitable material. In some embodiments, the housing 102 may include a cover 104. The cover 104 may be removed to allow insertion or removal of the filter media 110 within the housing 102. In particular embodiments, an end cap assembly comprising a first end cap 120 positioned at a first end of the filter media 110 may form base and sidewalls of the housing 102, and the second end cap 130 positioned at a second end of the filter media 110 opposite the first end may form the cover 104.

The filter media 110 is positioned along a longitudinal axis $A_L$ of the filter element 100. In some embodiments, the filter media 110 may comprise a corrugated and wound filter media configured for axial flow. For example, the filter media 110 may include a plurality of filter media layers formed by winding or rolling a single layer of filter media 110 into a cylindrical shape. In various embodiments, the filter media 110 may be configured for axial flow. For example, the corrugations of the plurality of filter media layers may define axial flow channels therebetween so as to allow axial flow of the gas through the axial flow channels.

As previously described, the filter element 100 may include a rotating crankcase ventilation filter element mounted on the central shaft 50 configured to rotate the filter element. The rotation may cause oil, particles or other contaminants included in the fluid (e.g., blowby gases) flowing through the channels formed between the plurality of layers of the filter media 110 to coalesce. The coalesced droplets are then removed from the filter element. Rotation of the filter element 100 may cause the filter media 110 to unwind. This may decrease filtering efficiency of the filter media 110 and may also cause a mass shift of the filter media 110 (e.g., causing a center of gravity or axis of the filter media 110 to shift). The mass unbalance may cause whirling of the central shaft 50 which may damage bearings on which the central shaft 50 is mounted and/or a turbine (e.g., the turbine 22) driving the central shaft 50.

The filter element 100 includes the first end cap 120 positioned on a filter media first end 111 and the second end cap 130 positioned on a filter media second end 113 of the filter media 110, at least one of which includes indenting features structured to indent and interlock the plurality of filter media layers of the filter media 110 at certain segments so as to prevent movement of the plurality of filter media layers relative to each other.

Expanding further, the first end cap 120 comprises a first end cap main body 122 formed from any suitable material, for example, plastics, polymers, metals, etc. The first end cap main body 122 may comprise a disc having a cross-section corresponding to or larger than an outer cross-section of the filter media 110. A first plurality of indenting features 124 are positioned on the first end cap main body 122 proximate to the filter media first end 111. For example, the first plurality of indenting features 124 may include ribs or pillars extending from the first end cap main body 122 towards the filter media 110. An edge of each of the first plurality of indenting features 124 proximate to the filter media first end 111 may be flat, rounded or may have a knife edge defined on an axial edge thereof.

The first plurality of indenting features 124 are configured to contact and indent corresponding segments of the filter media 110 at the filter media first end 111, causing the plurality of filter media layers to interlock at the corresponding segments of the filter media first end 111. The interlocking prevents movement of the plurality of filter media layers relative to each other. For example, the first end cap 120 may be positioned on the filter media first end 111 with sufficient force so as to cause the first plurality of indenting features 124 to indent (e.g., crimp) the plurality of the filter media layers with each other at the indented segments. In this manner, the plurality of filter media layers become interlocked which prevents movement of the plurality of filter media layers relative to each other when the filter element 100 is rotated.

In particular embodiments, the first end cap 120 may comprise a plurality of flow vanes extending axially from the first end cap main body 122 towards the filter media 110. The plurality of flow vanes may include one or more inlets configured to allow fluid to enter radially relative to the filter media 110 into radial flow channels defined between the plurality of flow vanes. Each of the plurality of flow vanes may be positioned perpendicular to the plurality of filter media layers of the filter media 110 such that the plurality of radial flow channels defined therebetween are in fluid communication with the flow paths defined between one or more of the plurality of filter media layers.

In such embodiments, the first plurality of indenting features 124 may comprise a knife edge defined on an axial edge of each of a set of the plurality of flow vanes. For example, a set of the plurality of flow vanes positioned at predetermined locations on the first end cap main body 122 may each have a knife edge defined at an axial edge thereof. In some embodiments, the first plurality of indenting features 124 may be positioned axisymmetrically on the first end cap main body 122 (i.e., positioned symmetrically around the longitudinal axis $A_L$).

For example, each of the set of the plurality of flow vanes may be positioned in a radial array such that an angle between adjacent flow vanes included in the set of the plurality of flow vanes may be in range of 10 degrees to 180 degrees. In some embodiments, the set of the plurality of flow vanes may be located at the four poles of first end cap main body 122 such that adjacent flow vanes of the set of the plurality of flow vanes have an angular pitch of 90 degrees. In other embodiments, the set of the plurality of flow vanes may include three vanes having an angular pitch of 120 degrees.

In some embodiments, the first end cap 120 may also comprise a first central pillar 126 extending axially from the first end cap main body 122 at least a portion of a length of a central channel 112 defined by the filter media 110. The first central pillar 126 may include engaging features (e.g., a snap fit mechanism) configured to engage corresponding second engaging features defined on a corresponding second central pillar 136 of the second end cap 130, as described in further detail herein. One or more first support pillars may be positioned around the first central pillar 126, and may also extend from the first end cap main body 122 into the central channel 112. The one or more first support pillars may also include engaging features (e.g., a snap fit mechanism) configured to engage corresponding engaging features defined on second support pillars of the second end cap 130. First spacer ribs 128 may extend radially outwards from the first central pillar 126. The first spacer ribs 128 may have a length corresponding to a cross-section of the central channel 112 (e.g., a radius thereof). For example, the filter media 110 may be wound around the first spacer ribs 128 such that the first spacer ribs 128 define the cross-section (e.g., diameter) of the central channel 112.

The second end cap 130 comprises a second end cap main body 132. A second plurality of indenting features 134 are positioned on the second end cap main body 132 proximate to the filter media second end 113 opposite the filter media first end 111. The second plurality of indenting features 134 are configured to contact and indent corresponding segments of the filter media second end 113 causing the plurality of filter media layers to also interlock at the corresponding segments of the filter media 110 at the filter media second end 113, as described with respect to the first end cap 120. In various embodiments, the second end cap main body 132 may define a ring shaped structure defining an axial outlet configured to allow filtered fluid (e.g., filtered blowby gases) to exit the filter element 100.

In some embodiments, the second end cap 130 may comprise a plurality of ribs extending axially from the second end cap main body 132 towards the filter media 110. The second plurality of indenting features 134 may also comprise a knife edge defined on an axial edge of each of a set of the plurality of ribs. In some embodiments, the second plurality of indenting features 134 may be positioned axisymmetrically on the second end cap main body 132, for example as described with respect to the first end cap 120. The set of the plurality of ribs may be equal or different in number to the set of plurality of flow vanes, and may be axially aligned or offset from the set of the plurality of flow vanes of the first end cap 120.

In some embodiments, each of the plurality of ribs may also include flow vanes defining outlet flow channel therebetween. Filtered fluid (e.g., filtered blowby gases) flowing axially through the flow paths between the plurality of filter media layers may flow into the outlet flow channels and may be redirected to flow in a radial direction towards the axial outlet defined in the second end cap main body 132 and out of the filter element 100.

In some embodiments, the second end cap 130 may also include the second central pillar 136 and one or more second spacer ribs 138 extending from the second central pillar 136 towards a rim of the axial outlet. The second central pillar 136 is axially aligned with the first central pillar 126 and extends into the central channel 112 towards the first central pillar 126. The second spacer ribs 138 may be coupled to the second end cap main body 132 such that the second central pillar 136 is suspended over the axial outlet, and a plurality of gaps between adjacent second spacer ribs 138 fluidly couple flow channels defined between the plurality of ribs 128 to the axial outlet. One or more second support pillars may also be positioned around the second central pillar 136 and may also include engaging features (e.g., a snap-fit or friction fit features) configured to engage corresponding engaging features provided on the first supporting pillars.

Figure 2:
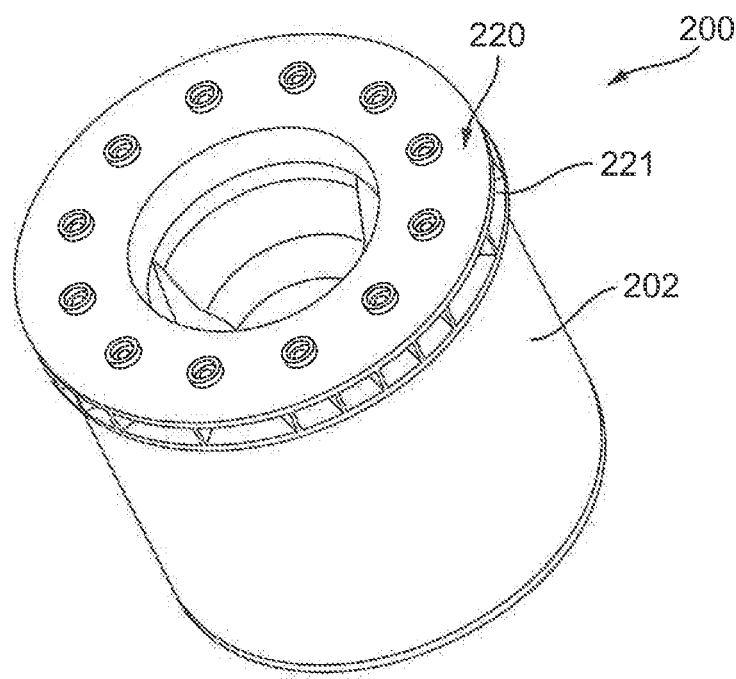
FIG. 2 is a top perspective view of a first end cap and a second end cap of a filter element coupled together, according to another embodiment.
Figure 3:
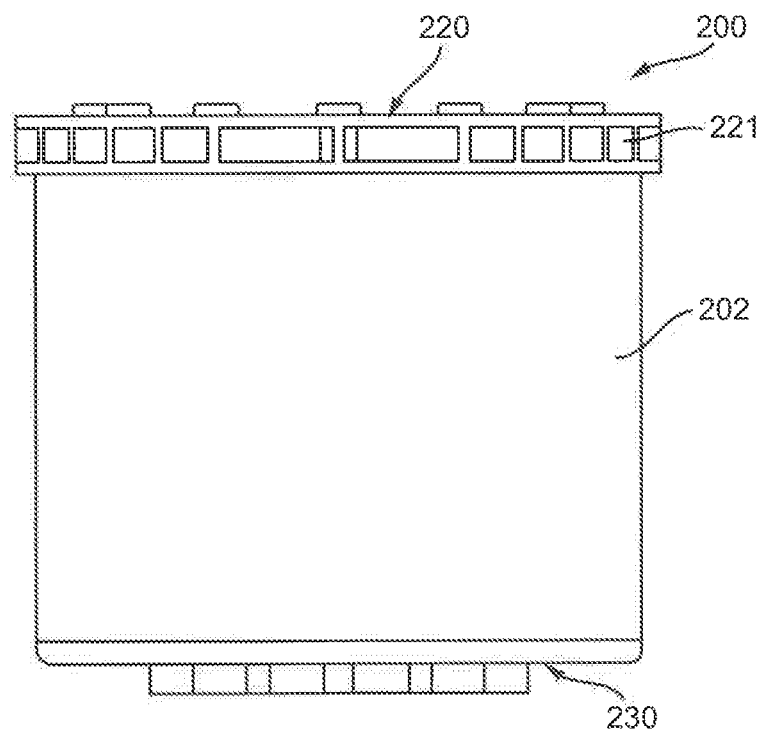
FIG. 3 is a side view of the filter element of FIG. 2.

FIG. 2 is a top perspective view and FIG. 3 is a side view of a filter element 200 that may be used as the filter element in the crankcase ventilation system 10 or any other crank case ventilation system, according to an embodiment. The filter element 200 may be used to filter a fluid e.g., blowby gases or any other fluid used in internal combustion engines. The filter element 200 comprises a housing 202 defining an internal volume within which a wound filter media 210 shown in FIG. 15, or any other filter media (e.g., the filter media 110) may be disposed. The filter element 200 comprises an end cap assembly including a first end cap 220 which forms the housing 202, and a second end cap 230 coupled to the first end cap 220.

Referring to FIGS. 3-8 which show various views of the first end cap 220, the first end cap 220 comprises a first end cap main body 222 formed from any suitable material, for example, plastics, polymers, metals, etc. The first end cap main body 222 comprises a circular disc having a cross-section corresponding to an outer cross-section of the filter media 210. In other embodiments, the first end cap main body 222 may have any suitable shape or cross-section, for example, square, rectangular, elliptical, race track shape, asymmetrical or any other suitable shape (e.g., corresponding to an outer cross-section of the filter media which may be positioned in the housing 202).

The first end cap 220 comprises a plurality of flow vanes 223 extending axially from the first end cap main body 222 towards the internal volume defined by the housing 202 so as to define a plurality of radial flow channels 225. The plurality of flow vanes 223 include inlets 221 configured to allow fluid to enter radially relative to the filter media 110 into the radial flow channels 225 defined between adjacent flow vanes 223. Each of the plurality of flow vanes 223 may be positioned perpendicular to a plurality of filter media layers 214 of the filter media 210 such that the flow channels defined therebetween are in fluid communication with the flow paths defined between one or more of the plurality of filter media layers 214.

The housing 202 may be positioned over the plurality of flow vanes 223 and coupled thereto such that a plurality of inlets 221 are formed between the first end cap main body 222 and a housing first end proximate to the first end cap main body 222, with sidewalls thereof formed by adjacent flow vanes 223. In some embodiments, the housing 202 may be monolithically formed with the first end cap main body 222 such that the first end cap 220 includes the housing 202.

The first end cap 220 comprises a first plurality of indenting features 224 configured to contact and indent corresponding segments at a filter media first end of the filter media 210 so as to interlock the plurality of filter media layers 214 at the corresponding segments of the filter media 210, the interlocking preventing movement of the plurality of filter media layers 214 relative to each other, as previously described herein. As shown in FIGS. 4-8, a set 223a of the plurality of flow vanes 223 positioned axisymmetrically on the first end cap main body 222 each have a knife edge defined at an axial edge thereof, the knife edge forming the corresponding indenting feature 224. Specifically, the set 223a of the plurality of flow vanes 223 may be located at the four poles of the first end cap main body 222 such that adjacent flow vanes 223 of the set 223a of the plurality of flow vanes 223 have an angular pitch of 90 degrees. In other embodiments, fewer or more of the plurality of flow vanes 223 may define the indenting feature 224, or the set 223a of the plurality of flow vanes 223 may be located at any other position or at any angular pitch. For example, each of the set 223a of the plurality of flow vanes 223 may be positioned in a radial array such that an angle between adjacent flow vanes 223 included in the set 223a may be in a range of 10 degrees to 180 degrees. In other embodiments, the set 223a of the plurality of flow vanes 223 may include three flow vanes having an angular pitch of 120 degrees.

Figure 5:
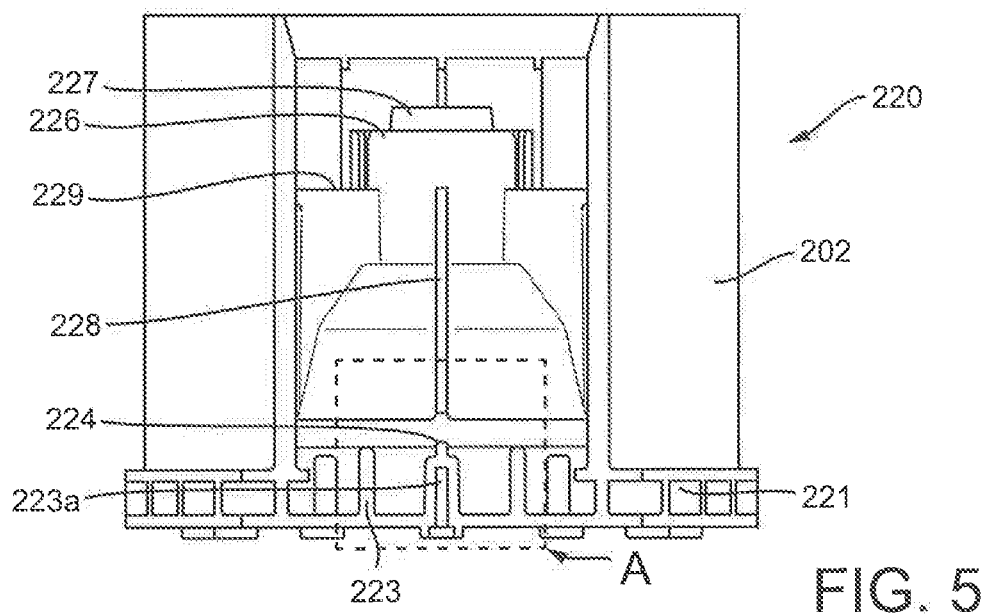
FIG. 5 is a side cross-section view of a portion of the first end cap of FIG. 4.
Figure 6:
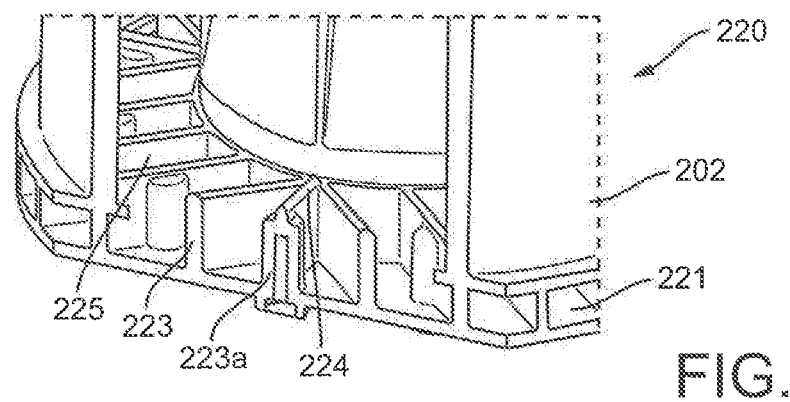
FIG. 6 is another side cross-section view of the first end cap of FIG. 4.
Figure 7:
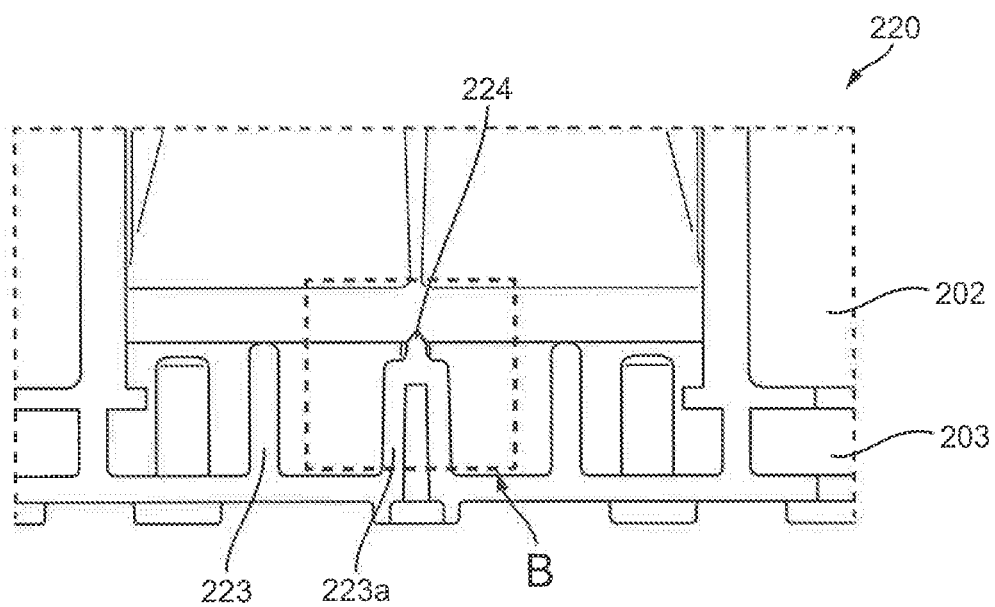
FIG. 7 is another side cross-section view of a portion of the first end cap of FIG. 4 as indicated by the arrow A in FIG. 5.
Figure 8:
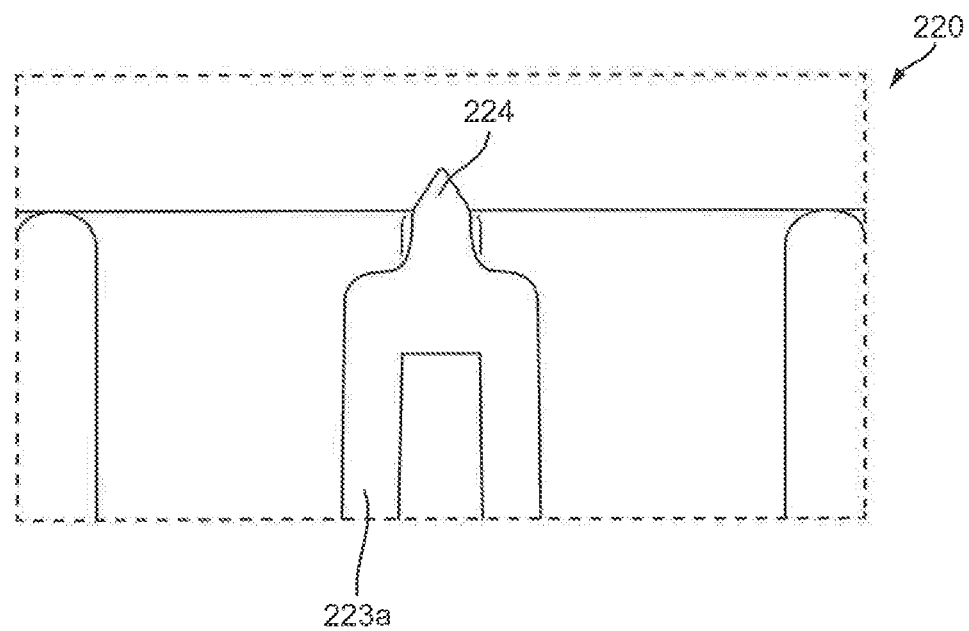
FIG. 8 is a side cross-section of a portion of the first end cap of FIG. 4 as indicated by the arrow B in FIG. 7.
Figure 9:
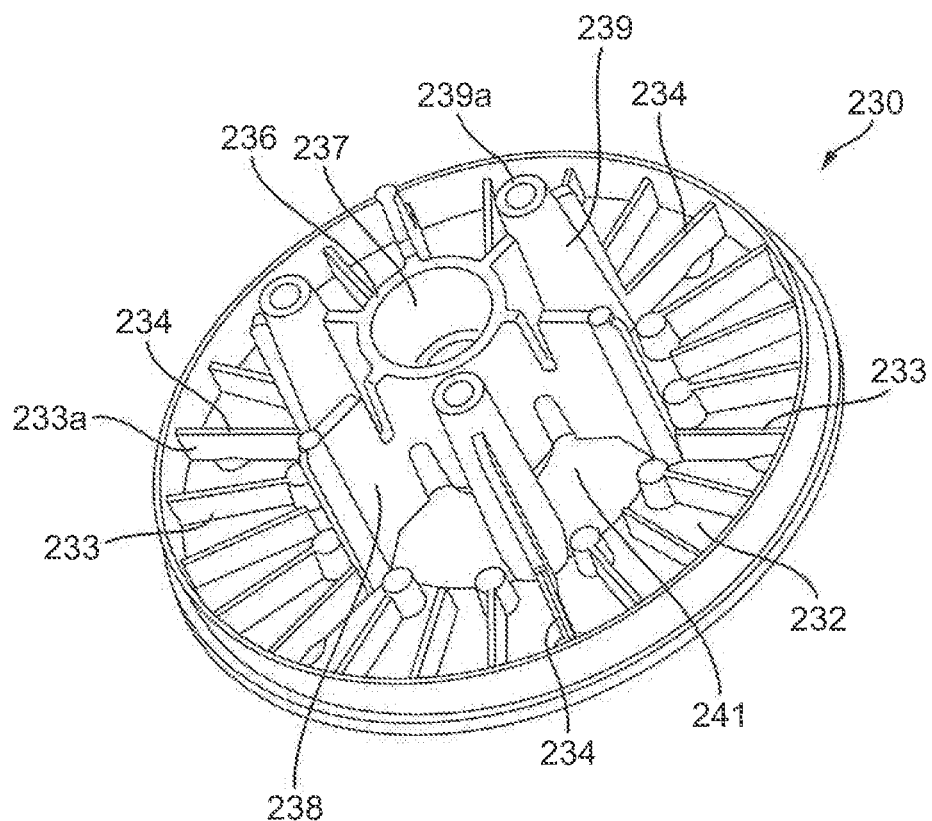
FIG. 9 is a top perspective view of a second end cap of the filter element of FIG. 2, according to an embodiment.
Figure 10:
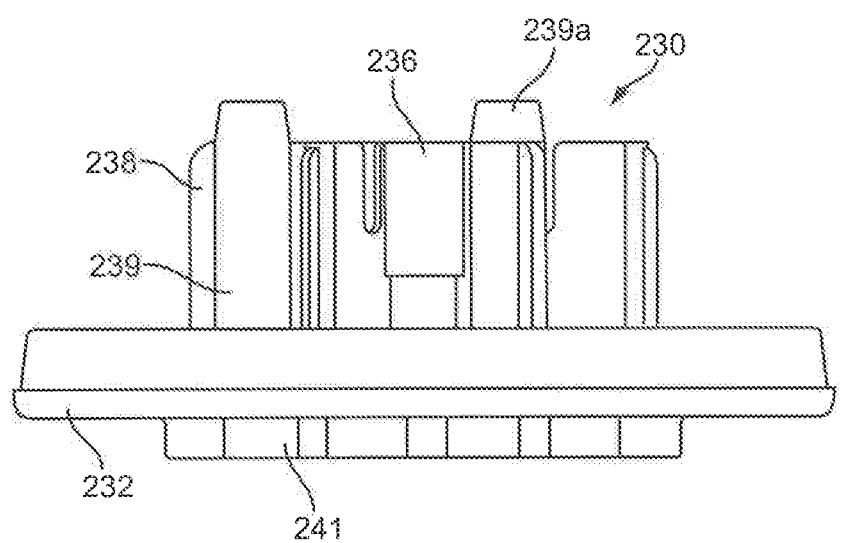
FIG. 10 is a side view of the second end cap shown in FIG. 9.
Figure 11:
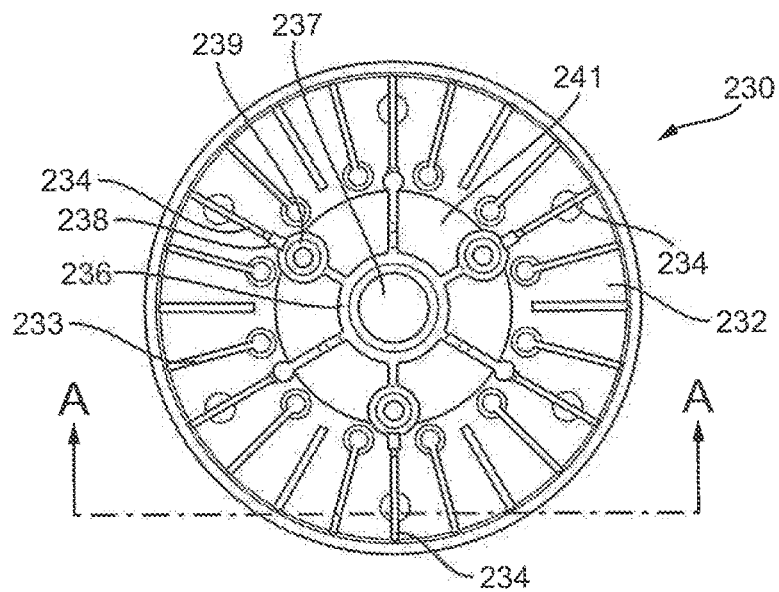
FIG. 11 is a top view the second end cap of FIG. 9.
Figure 12:
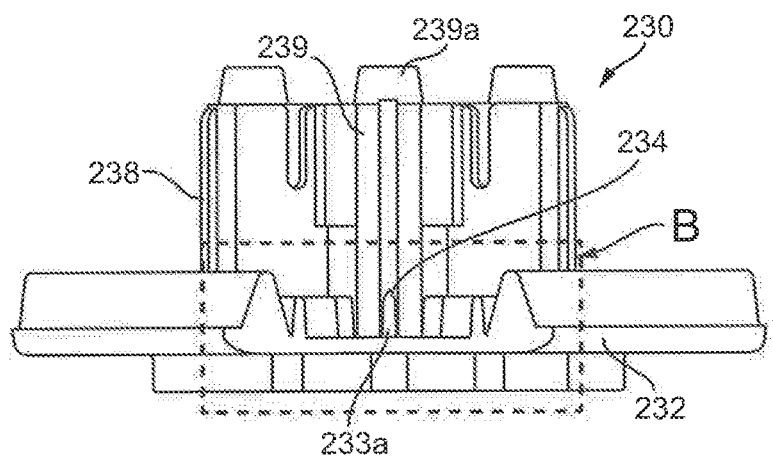
FIG. 12 is a side cross-section view of the second end cap of FIG. 9 taken along the line A-A shown in FIG. 11.
Figure 13:
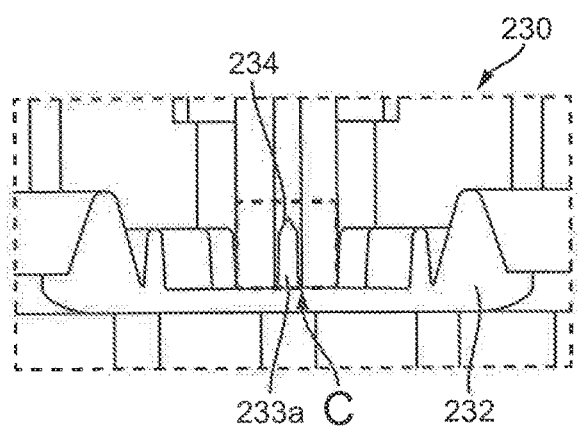
FIG. 13 is a side cross-section view of a portion of the second end cap of FIG. 9 shown in FIG. 12 as indicated by the arrow B.
Figure 14:
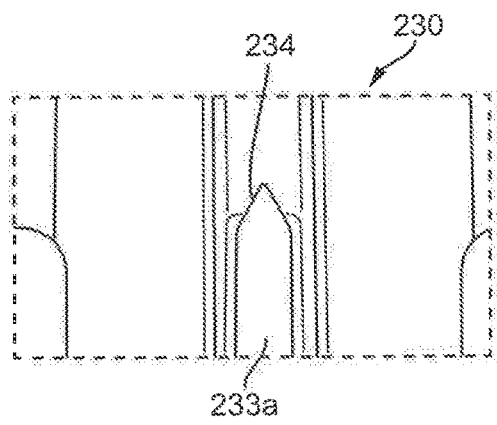
FIG. 14 is another side cross-section view of a portion of the second end cap of FIG. 9 indicated by the arrow C in FIG. 13.

The first end cap 220 may also comprise a first central pillar 226 extending axially from the first end cap main body 222 having a length which may be smaller than a height of the housing 202 so as to extend at least a portion of a length of a central channel 212 defined by a filter media 210 which may be positioned in the housing 202. The first central pillar 226 may include engaging features (e.g., a snap fit mechanism) configured to engage corresponding second engaging features defined on a corresponding second central pillar 236 of the second end cap 230, as described in further detail herein. For example, as best shown in FIG. 5, a protrusion 227 extends from an axial end of the first central pillar 226 distal from the first end cap main body 222. The protrusion 227 may be configured to be inserted into a mating receptacle 237 defined in a second central pillar of the second end cap 230, for example, to facilitate aligning of the first end cap 220 with the second end cap 230 and/or snap-fit or friction fit the first end cap 220 to the second end cap 230.

Figure 4:
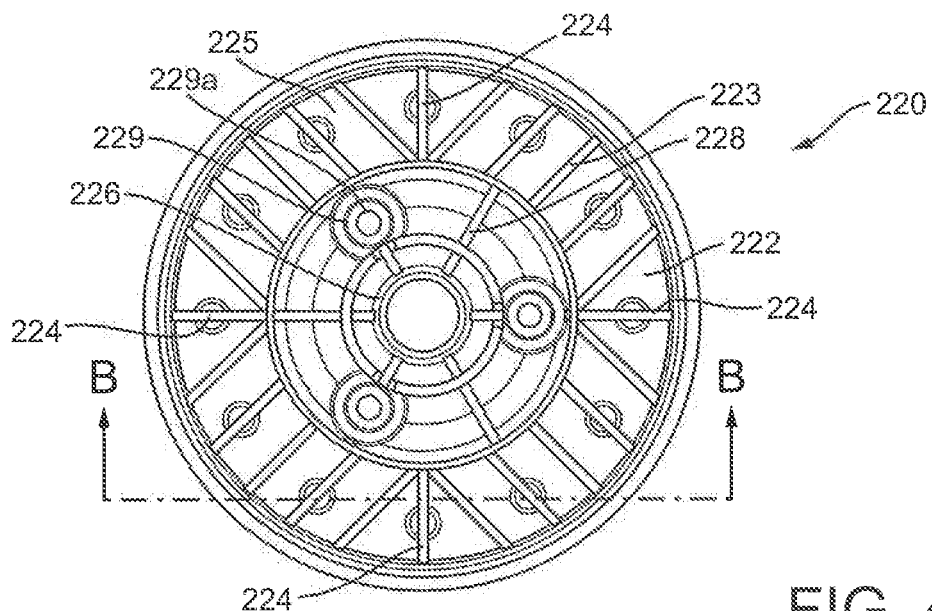
FIG. 4 is a bottom view of a first end cap of the filter element of FIG. 2, according to an embodiment.

A plurality of first support pillars 229 are positioned around the first central pillar 226, and may also extend from the first end cap main body 222 into the central channel 212. Each of plurality of first support pillars 229 may also include engaging features (e.g., a snap fit mechanism) configured to engage corresponding engaging features defined on second support pillars 239 of the second end cap 230. For example, and as shown in FIG. 4, each of the plurality of first support pillars 229 may define apertures 229a configured to receive corresponding protrusions 239a defined on the second support pillars 239. In this manner, the plurality of first support pillars 229 and the plurality of second support pillars 239 may interlock so as to prevent rotation of the first end cap 220 and the second end cap 230 relative to each other.

First spacer ribs 228 may extend radially outwards from the first central pillar 226. The first spacer ribs 228 may have a length corresponding to a cross-section of the central channel 212 (e.g., a radius thereof). For example, an outer edge of each of the plurality of first spacer ribs 228 distal from the first central pillar 226 may correspond to an inner periphery of the filter media 210 positioned within the housing 202. The plurality of filter media layers 214 may be wound around the first spacer ribs 228, or wound outside of the housing 202 to formed the cylindrical filter media 210 and then positioned around the first spacer ribs 228 within the housing 202 such that the first spacer ribs 228 define a cross-section (e.g., diameter) of the central channel 212 of the filter media 210. Thus, the plurality of first spacer ribs 228 may be configured to facilitate proper positioning of the filter media 210 within the housing 202, for example, positioning of the filter media 210 concentrically around the first central pillar 226.

FIGS. 9-14 show various views of the second end cap 230 of the filter element 200. The second end cap 230 comprises a second end cap main body 232. A second plurality of indenting features 234 are positioned on the second end cap main body 232 proximate to the filter media second end opposite the filter media first end. The second plurality of indenting features 234 are configured to contact and indent corresponding segments of a filter media second end of the filter media 210 causing the plurality of filter media layers 214 to also interlock at the corresponding segments of the filter media second end, as described with respect to the first end cap 220. The second end cap main body 232 defines a ring shaped structure defining an axial outlet 241 configured to allow filtered fluid to exit the filter element via the second end cap 230.

The second end cap 230 may comprise a plurality of ribs 233 extending axially from the second end cap main body 232 into the housing 202. The second plurality of indenting features 234 may also comprise a knife edge defined on an axial edge of each of a set 233a of the plurality of ribs 233. As shown, the second plurality of indenting features 234 are positioned axisymmetrically on the second end cap main body 234 having a pitch of 120 degrees therebetween. In other embodiments, the second plurality of indenting features 234 may be equal in number to the first plurality of indenting features 224 and may be axially aligned with or offset from the first plurality of indenting features 224.

In some embodiments, each of plurality of ribs 233 may also include flow vanes defining outlet flow channel therebetween. Filtered fluid (e.g., blowby gases) flowing axially through the flow paths between the plurality of filter media layers 214 may flow into the outlet flow channels defined between the plurality of ribs 233 and may be redirected to flow in a radial direction towards the axial outlet 241 defined in the second end cap main body 232 and out of the housing 202.

The second end cap 230 may also include the second central pillar 236 and one or more second spacer ribs 238 extending from the second central pillar 236 towards a rim of the axial outlet 241. The second central pillar 236 is axially aligned with the first central pillar 226 and extends towards the first central pillar 226. The receptacle 237 of the second central pillar 236 is configured to receive the protrusion 227 of the first central pillar 226, as previously described herein. Mating the protrusion 227 with the receptacle 237 may facilitate alignment of the first end cap 220 with the second end cap 230. In some embodiments, the protrusion 227 may be configured to snap-fit or friction fit into the receptacle 237, for example, to removably couple the first end cap 220 to the second end cap 230.

A plurality of second spacer ribs 238 extend radially from the second central pillar 236 towards an inner rim of the second end cap main body 232. The second spacer ribs 238 may be coupled to the second end cap main body 232 such that the second central pillar 236 is suspended over the axial outlet 241, and a plurality of gaps defined between adjacent second spacer ribs 238 fluidly couple flow channels defined between the plurality of ribs 234, an outer perimeter of the second central pillar 236 and an inner perimeter of the second end cap main body 232 to the axial outlet 241. A plurality of second support pillars 239 may also be positioned around second central pillar 236. Each of the second support pillars 239 define a protrusion 239a extending from an axial end thereof. The protrusions 239a are configured to be inserted into the corresponding aperture 229a defined in the corresponding first support pillar 229, as previously described herein.

The filter element 200 may be positioned within the housing 202 on the first plurality of indenting features 224 of the first end cap 220. The second end cap 230 may then be coupled to the first end cap 220. The height of each of the first plurality of indenting features 224 and the second plurality of indenting features 234 are structured such that when the first end cap 220 is coupled to the second end cap 230, the plurality of indenting features 224 and 226 indent corresponding segments of the filter media 210 at a first and second end thereof, respectively so as to interlock the plurality of filter media layers 214, as previously described herein.

Figure 15:
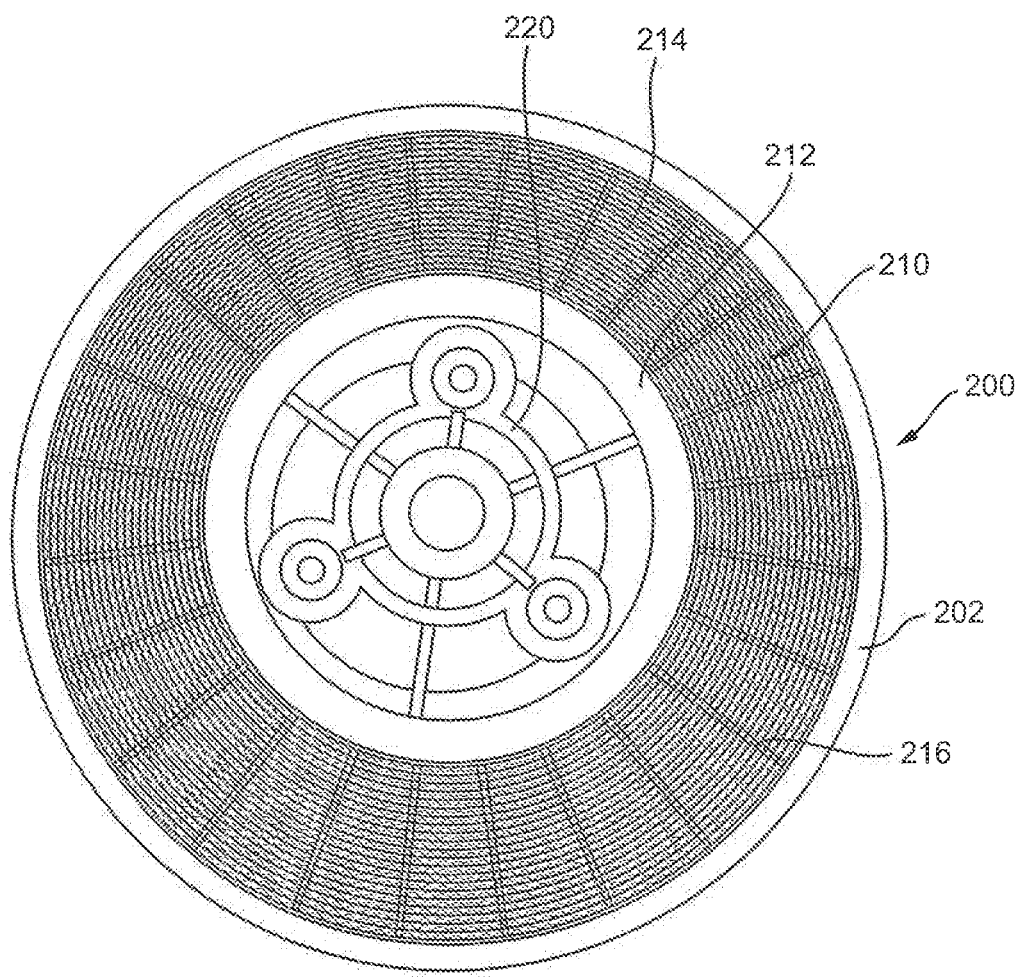
FIG. 15 is a top view of the filter element of FIG. 2 with the first end cap removed to show indentations formed by indenting features of the first end cap on a plurality of filter media layers of a filter media disposed in the housing.

FIG. 15 is top view of the filter element 200 with the filter media 210 positioned within the housing 202. The filter media 210 comprises the plurality of filter media layers 214 wound in a roll so as to form the filter media 210. The second end cap 230 is removed to show a plurality of indentations 216 formed on the filter media second end of the filter media 210 by the second plurality of indenting features 234 of the second end cap 230. As previously described, the plurality of filter media layers 214 interlock at the indentations 216 and also on corresponding indentations formed on the filter media at the filter media first end (not shown) by the first plurality of indenting features 224, which prevents movement of the plurality of filter media layers 214 relative to each other when the filter element 200 is rotated or spun.

Figure 16:
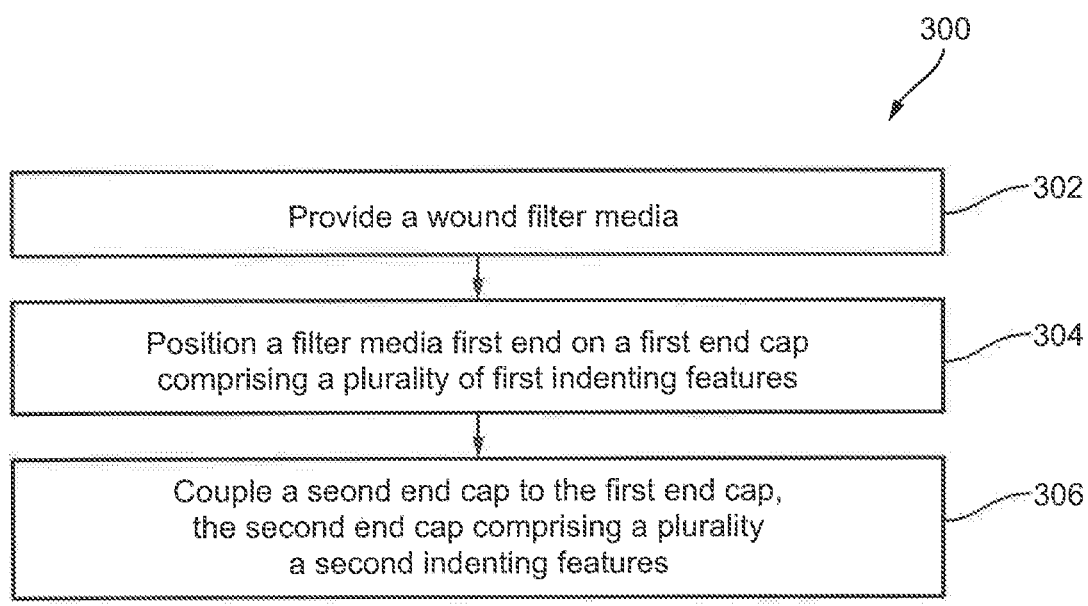
FIG. 16 is a schematic flow diagram of a method for securing a plurality of filter media layers of a filter media within a housing extending from the first end cap.

FIG. 16 is a schematic flow diagram of a method 300 for preventing movement of a plurality of filter media layers (e.g., the plurality of filter media layers 214) of a filter media (e.g., the filter media 110, 210) relative to each other when a filter element (e.g., the filter element 100, 200) including the filter media is rotated, according to an embodiment. The method 300 comprises providing a filter media, at 302. The filter media may include, for example, the filter media 110, 210 and may include a plurality of filter media layers (e.g., the plurality of filter media layers 214). In particular embodiments, the plurality of filter media layers may be wound in a roll so as to form a cylindrical filter media.

At 304, a filter media first end of the filter media is positioned on a first end cap comprising a plurality of a first flow vanes, a set of the plurality of flow vanes including a knife edge configured to contact and indent corresponding segments of the filter media first end. For example, the filter media 110, 310 is positioned within the housing 102, 202 on the first end cap 120, 220 comprising the first plurality of indenting features 124, 224, as previously described herein.

At 306, a second end cap is coupled to the first end cap or a filer media second end opposite the filter media first end. The filter media 110, 210 may be pushed down on the first end cap 120, 220, for example, by the second end cap to cause the first plurality of indenting features 124, 224 of the first end cap 120, 220 to indent the filter media 110, 210 at the filter media first end. In some embodiments, the second end cap (e.g., the second end cap 130, 230) may also comprise a second plurality of indenting features (e.g., the second plurality of indenting features 134, 234) which may contact and indent the plurality of filter media layers at the filter media second end. In particular embodiments, the second end cap may comprise a plurality of ribs, a set of the plurality of ribs including a knife edge forming the second plurality of indenting features configured to contact and indent corresponding segments of the filter media second end opposite the filter media first end. For example, the second end cap 130, 230 is coupled to the housing 102, 202 causing the second plurality of indenting features 134, 234 the filter media second end. The indents caused by the plurality of first and second indenting features 124, 224 and 134, 234 causes the plurality of filter media layers 214 to interlock at the indents so as to prevent relative movement of the plurality of filter media layers 214, which may cause the filter media 110, 210 to unwind, relative to each other.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A rotating crankcase ventilation filter element, comprising:
    a filter media comprising a plurality of filter media layers; and
    a first end cap positioned on a filter media first end of the filter media, the first end cap comprising:
        a first end cap main body;
        a plurality of flow vanes extending axially from the first end cap main body towards the filter media, plurality of flow vanes defining radial flow channels therebetween; and
        a first plurality of indenting features positioned on each of a set of the plurality of flow vanes proximate the filter media first end, the first plurality of indenting features contacting and indenting corresponding segments of the filter media first end, causing the plurality of filter media layers to interlock at the corresponding segments, the interlocking preventing movement of the plurality of filter media layers relative to each other, wherein each of the plurality of flow vanes is positioned perpendicular to the plurality of filter media layers of the filter media such that indentations formed by first plurality of indenting features on the filter media are perpendicular to the plurality of filter media layers.

2. The filter element of claim 1, wherein the plurality of flow vanes extend axially towards the filter media, and wherein the first plurality of indenting features comprise a knife edge defined on an axial edge of each of the set of the plurality of flow vanes.

3. The filter element of claim 2, wherein each radial flow channel fluidly is coupled to a corresponding radial inlet defined at a radially outer end of each radial flow channel.

4. The filter element of claim 1, wherein the first plurality of indenting features are positioned axisymmetrically on the first end cap main body.

5. The filter element of claim 1, wherein the filter media comprises a wound filter media.

6. The filter element of claim 1, further comprising a second end cap positioned on a filter media second end of the filter media opposite the filter media first end, the second end cap comprising:
- a second end cap main body, and
- a second plurality of indenting features positioned on the second end cap main body proximate to the filter media second end, the second plurality of indenting features configured to contact and indent corresponding segments of the filter media second end causing the plurality of filter media layers to also interlock at the corresponding segments of the filter media second end.

7. The filter element of claim 6, wherein the second end cap comprises a plurality of ribs extending axially from the second end cap main body towards the filter media, and wherein the second plurality of indenting features comprise a knife edge defined on an axial edge of each of a set of the plurality of ribs.

8. The filter element of claim 6, wherein the first end cap further comprises a first central pillar extending axially from the first end cap main body towards the second end cap, wherein the second end cap further comprises a second central pillar extending from the second end cap main body towards the first end cap, and wherein the first central pillar defines first engaging features configured to engage corresponding second engaging features defined on the second central pillar.

9. The filter element of claim 8, wherein the first end cap further comprises at least one first support pillar disposed around the first central pillar, the at least one first support pillar extending axially from the first end cap main body towards the second end cap, wherein the second end cap comprises at least one second support pillar disposed around the second central pillar, the at least one second support pillar extending axially from the second end cap main body towards the first end cap, and wherein the at least one first support pillar defines engaging features configured to engage corresponding engaging features defined on the at least one second support pillar.

* * * * *